United States Patent
Mustafi et al.

(10) Patent No.: US 11,783,073 B2
(45) Date of Patent: Oct. 10, 2023

(54) CONFIGURATION OF DEFAULT SENSITIVITY LABELS FOR NETWORK FILE STORAGE LOCATIONS

(71) Applicant: MICROSOFT TECHNOLOGY LICENSING, LLC, Redmond, WA (US)

(72) Inventors: Sanjoyan Mustafi, Redmond, WA (US); Pradeep Kamalakumar, Hyerabad (IN); Karthik Reddy Gangidi, Hyerabad (IN); Mohan Swaroop Maheshwari, Hyerabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 102 days.

(21) Appl. No.: 17/353,625

(22) Filed: Jun. 21, 2021

(65) Prior Publication Data

US 2022/0405412 A1 Dec. 22, 2022

(51) Int. Cl.
*G06F 7/04* (2006.01)
*G06F 21/62* (2013.01)
(Continued)

(52) U.S. Cl.
CPC ........ *G06F 21/6218* (2013.01); *G06F 16/134* (2019.01); *G06F 16/176* (2019.01);
(Continued)

(58) Field of Classification Search
CPC .. G06F 21/6218; G06F 16/183; G06F 16/176; G06F 16/134; G06F 21/602; G06F 2221/2113
See application file for complete search history.

(56) References Cited

U.S. PATENT DOCUMENTS 7,958,259 B2 * 6/2011 Saika .................. H04L 47/2433
709/240
8,208,000 B1 * 6/2012 Swanson .................. H04N 7/14
348/14.08

(Continued)

OTHER PUBLICATIONS

"International Search Report and Written Opinion Issued in PCT Patent Application No. PCT/US22/029084", dated Aug. 12, 2022, 13 Pages.

(Continued)

*Primary Examiner* — Gary S Gracia
(74) *Attorney, Agent, or Firm* — Newport IP, LLC; Jacob P. Rohwer (57) ABSTRACT

Disclosed herein is a system for enabling a default label to be configured for a network location created to store files. The default label can be assigned at a time when the files are uploaded to the network location. An owner of the network location can define the default label to be assigned to the files. Whenever an unlabeled file is uploaded to the network location, the unlabeled file automatically inherits the default label. Furthermore, the system is configured to consider an order of label priority when determining whether to assign a default label to a previously labeled file to be uploaded to the network location. The system is configured to upgrade a file with a preassigned label of lower priority to the default label, while permitting another file to be stored without a label change if the preassigned label is of higher priority compared to the default label.

16 Claims, 7 Drawing Sheets

(51) Int. Cl.
*G06F 16/182* (2019.01)
*G06F 16/176* (2019.01)
*G06F 16/13* (2019.01)
*G06F 21/60* (2013.01)
*H04N 7/16* (2011.01)

(52) U.S. Cl.
CPC .......... *G06F 16/183* (2019.01); *G06F 21/602* (2013.01); *G06F 2221/2113* (2013.01)

(56) References Cited

U.S. PATENT DOCUMENTS

| | | | | |
|---|---|---|---|---|
| 8,286,255 B2* | 10/2012 | Grant | | G06F 21/6218 713/182 |
| 9,396,456 B1* | 7/2016 | Wang | | G06Q 10/107 |
| 9,807,073 B1* | 10/2017 | Miller | | G06F 21/6218 |
| 10,242,222 B2* | 3/2019 | Rundle | | G06F 21/6218 |
| 10,530,832 B2* | 1/2020 | Dziezanowski | | H04L 67/02 |
| 10,667,680 B2* | 6/2020 | Gupta | | A61B 5/7275 |
| 10,866,963 B2* | 12/2020 | Kleinpeter | | G06F 16/122 |
| 10,984,122 B2* | 4/2021 | Thomas | | H04L 63/1433 |
| 11,599,312 B1* | 3/2023 | Dufort | | G06F 3/1268 |
| 2002/0049786 A1* | 4/2002 | Bibliowicz | | G06F 3/04812 715/234 |
| 2003/0196108 A1* | 10/2003 | Kung | | H04L 9/3268 713/175 |
| 2006/0221858 A1* | 10/2006 | Switzer | | G06F 9/451 370/254 |
| 2007/0016684 A1* | 1/2007 | Stieglitz | | H04L 63/102 726/21 |
| 2007/0271212 A1* | 11/2007 | Jones | | G06F 21/6227 707/999.009 |
| 2007/0282752 A1* | 12/2007 | Jones | | H04L 63/105 705/57 |
| 2008/0046828 A1* | 2/2008 | Bibliowicz | | G06Q 10/10 715/751 |
| 2008/0147695 A1* | 6/2008 | Masek | | G06F 16/176 |
| 2008/0168134 A1* | 7/2008 | Goodman | | G06F 16/9535 709/204 |
| 2010/0146593 A1* | 6/2010 | Stahl | | G06F 21/6272 726/4 |
| 2010/0299763 A1* | 11/2010 | Marcus | | G06Q 10/06 726/30 |
| 2010/0332998 A1* | 12/2010 | Sun | | G06F 3/04815 715/757 |
| 2011/0173443 A1* | 7/2011 | Osterwalder | | H04L 63/123 713/168 |
| 2011/0314392 A1* | 12/2011 | Howarth | | G06F 21/6218 715/753 |
| 2012/0317135 A1* | 12/2012 | Jin | | G06F 16/176 707/769 |
| 2013/0145284 A1* | 6/2013 | Anantharaman | | H04M 3/567 715/753 |
| 2013/0198618 A1* | 8/2013 | Tanzer | | G06F 40/134 715/255 |
| 2013/0246901 A1* | 9/2013 | Massand | | G06F 40/197 715/229 |
| 2014/0006095 A1* | 1/2014 | Doran | | G06Q 10/10 705/7.28 |
| 2014/0059344 A1* | 2/2014 | Branton | | G06F 21/10 713/165 |
| 2014/0137185 A1* | 5/2014 | Tirosh | | H04L 63/105 726/28 |
| 2014/0227673 A1* | 8/2014 | Yousef | | G09B 5/00 434/350 |
| 2014/0280955 A1* | 9/2014 | Stuntebeck | | H04L 63/0435 709/226 |
| 2015/0100503 A1* | 4/2015 | Lobo | | G06Q 10/103 705/301 |
| 2015/0134425 A1* | 5/2015 | LeGris | | G06Q 10/0639 705/7.38 |
| 2015/0312233 A1* | 10/2015 | Graham, III | | H04L 63/0435 713/171 |
| 2016/0078022 A1* | 3/2016 | Lisuk | | G06N 20/00 706/12 |
| 2016/0099949 A1* | 4/2016 | Leondires | | G06F 21/6218 726/28 |
| 2016/0212201 A1* | 7/2016 | Munemann | | H04L 67/306 |
| 2016/0294563 A1* | 10/2016 | Qian | | H04L 63/0428 |
| 2016/0315826 A1* | 10/2016 | Abdulnour | | H04L 41/5067 |
| 2016/0321469 A1* | 11/2016 | Bhogal | | G06F 16/93 |
| 2017/0052955 A1* | 2/2017 | Nandy | | G06F 16/93 |
| 2017/0147600 A1* | 5/2017 | Brand | | G06Q 10/107 |
| 2017/0193447 A1* | 7/2017 | Piyush | | H04L 67/306 |
| 2017/0193448 A1* | 7/2017 | Piyush | | H04L 67/1044 |
| 2017/0199942 A1* | 7/2017 | Ruffenach | | G06F 3/04842 |
| 2018/0150442 A1* | 5/2018 | Chieu | | G06F 21/31 |
| 2018/0352034 A1* | 12/2018 | Mutreja | | H04L 67/1097 |
| 2019/0095511 A1* | 3/2019 | Dhanasekaran | | G06F 16/25 |
| 2019/0102472 A1* | 4/2019 | Van Rensburg | | G06Q 10/101 |
| 2019/0205554 A1* | 7/2019 | Kleinpeter | | G06F 21/10 |
| 2019/0318109 A1* | 10/2019 | Thomas | | G06F 16/285 |
| 2019/0322298 A1* | 10/2019 | Mong | | B61L 23/005 |
| 2019/0347617 A1* | 11/2019 | Moore | | G06F 3/1238 |
| 2020/0053094 A1* | 2/2020 | Kaube | | G06F 9/44526 |
| 2020/0134218 A1* | 4/2020 | Liu | | G06F 21/602 |
| 2020/0142736 A1* | 5/2020 | Marmignon | | G06F 9/4881 |
| 2020/0145463 A1* | 5/2020 | Narayanaswamy | | H04L 63/12 |
| 2020/0159947 A1* | 5/2020 | Shenefiel | | H04L 63/1425 |
| 2020/0257810 A1* | 8/2020 | Vrabec | | H04L 63/20 |
| 2020/0374324 A1* | 11/2020 | Le Strat | | H04N 7/15 |
| 2020/0382435 A1* | 12/2020 | Holm | | H04L 47/193 |
| 2021/0012770 A1* | 1/2021 | Choudhary | | G06F 3/167 |
| 2021/0064571 A1* | 3/2021 | Shirai | | G06F 16/122 |
| 2021/0073449 A1* | 3/2021 | Segev | | G06F 30/27 |
| 2021/0149913 A1* | 5/2021 | Kleinpeter | | H04L 9/3213 |
| 2021/0232630 A1* | 7/2021 | Glendenning | | G06F 3/0481 |
| 2021/0326409 A1* | 10/2021 | Bose | | G06F 21/00 |
| 2022/0237639 A1* | 7/2022 | Costilla | | G07F 19/20 |
| 2022/0405412 A1* | 12/2022 | Mustafi | | G06F 16/176 |
| 2023/0117262 A1* | 4/2023 | Oakley | | G06F 16/148 707/692 |

OTHER PUBLICATIONS

Using security classification, Retrieved from: https://support.box.com/hc/en-us/articles/360043696734-Using-security-classification, Feb. 27, 2020, 3 Pages.
Using Security Labels for Directory Access and Replication Control, In Whitepaper of Isode, Apr. 17, 2008, 6 pages.
Bailey et al., "Apply A Sensitivity Label to Content Automatically", Retrieved from: https://docs.microsoft.com/en-us/microsoft-365/compliance/apply-sensitivity-label-automatically?view=o365-worldwide, Feb. 3, 2021, 20 Pages.
Butcher, Michael, "Box Shield inherit classification on move, not only on upload", Retrieved from: https://pulse.box.com/forums/909778-help-shape-the-future-of-box/suggestions/40085260-box-shield-inherit-classification-on-move-copy-no, Apr. 2, 2020, 3 Pages.
Winter et al., "Control Access with Sensitivity Labels", Retrieved from: https://docs.microsoft.com/en-us/azure/active-directory/fundamentals/8-secure-access-sensitivity-labels, Dec. 18, 2020, 6 Pages.

* cited by examiner

CONFIGURATION OF DEFAULT SENSITIVITY LABELS FOR NETWORK FILE STORAGE LOCATIONS

BACKGROUND

Some network services offer file management and storage systems to users, or customers. One of the features of these systems enables a user to create a separate, and centralized, network location for a set of files related in some way. Conceptually, the network location is a known space to which a network service provider allocates resources so that the files can be accessed by a group of users. In this sense, the network location may be referred to as a site or a file library that can be accessed by a uniform resource locator (URL) or another sort of network location identifier, for example. In many scenarios, the files may be related because they belong to a same task or project (e.g., a work project, a school project, a home project, etc.). Accordingly, the files can include word processing documents, presentation documents (e.g., a slide deck), spreadsheet documents, whiteboard documents, images (e.g., photos), videos, diagrams, drawings, computer code, and so forth. A group of users that have an interest in the set of related files can use the network location to store the files so they can easily be accessed and viewed by other users in the group. In other words, the network location provides an efficient and effective way to implement group collaboration and file sharing, while providing a centralized spot for file storage.

At the expense of the aforementioned benefits (e.g., group collaboration, file sharing, centralized file storage, etc.), there are some security issues associated with the creation and administration of these network locations. These security issues are exacerbated when aspects of the project for which the files are stored are sensitive and/or confidential. When the project includes sensitive and/or confidential aspects, the ability for users to download and view the content of the files stored in a network location needs to be limited and/or protected.

One conventional action to limit and/or protect the ability to download and view the content of an individual file includes a user manually applying a label to the individual file. A feature that implements this action is offered in various file creation applications. However, a series of steps must be employed to enable this labeling feature prior to uploading the file to a network location. Many users forget to take the steps necessary to implement this feature, thereby making the file susceptible to misuse by other users. Furthermore, some users do not forget but rather merely do not want to spend the time necessary to label an individual file prior to the file being uploaded to a network location.

Consequently, a security issue is more likely to occur when a user does not manually assign a label to an individual file prior to uploading the individual file to a network location. For instance, a user working on a secretive business project may upload some files to a network location but forget to manually assign a label that protects the files. Without the label, another user may download the files from the network location and/or create copies of the files in an insecure location. This other user may also unknowingly (or knowingly) share the files with users that would not have been able to open and view the files had an appropriate label been previously assigned to the files when the files were uploaded to the network location.

It is with respect to these and other considerations that the disclosure made herein is presented.

SUMMARY

The techniques disclosed herein enable a default label to be configured for a network location created to store files that are related in some way (e.g., files that are all associated with a project). Once configured, the default label can be assigned to files at a time when the files are uploaded to the network location. An owner of the network location, e.g., the user that creates and/or administers the network location, can define the default label to be assigned to the files stored in the network location. Whenever an unlabeled file is uploaded to the network location, the unlabeled file automatically inherits the default label. Consequently, users that upload files to the network location are covered, from the perspective of security and protection, if they forget or choose not to label the files uploaded to the network location. Moreover, the users can save time because there is no longer a need to manually label each file on the client side (e.g., an application executing on the user device) before the file is uploaded to the network location.

As described herein, a label specifies users that are allowed, or authorized, to open the files stored at the network location and to view the contents of the files. In one example, the label may specify the users by listing individual user identifications (e.g., actual names, account names, email addresses, etc.). In another example, the label may specify the users by listing defined user groups or user statuses (e.g., full time employees of the ABC company, employees of the ABC company that work in the finance department, any user with an email address with a specific domain, a specific team such as a leadership or executive team, a group of users participating in an educational class, etc.).

The label can also specify an encryption method for the files stored at the network location. The encryption method may be one of various types of encryption that provide different levels of protection for the files. The default label is incorporated into the file, and therefore, is useable to govern access to the file and/or to a copy of the file that is downloaded from the network location. In other words, the default label travels with the file and/or a copy of the file once it leaves the network location for additional protection. This prevents a copy of the file from being passed on to, and opened by, a user that is not authorized to view the contents of the file.

In various examples, the default label can be selected from a predefined set of labels established for a particular organization (e.g., a corporation, an educational institution, etc.). The predefined set of labels can be established by security or IT professionals on behalf of the organization. The ability to select a default label, from a predefined set of labels, provides improved flexibility and efficiencies for owners of network locations (e.g., storage sites, file libraries, etc.) to configure a network location level policy to protect files according to sensitivity and/or confidentiality considerations of various projects. Stated alternatively, the techniques described herein enable various levels of security to be implemented based on a degree of sensitivity and/or confidentiality associated with an individual project.

In addition to automatically assigning the default label to unlabeled documents, the techniques described herein are configured to consider an order of label priority when determining whether to assign a default label to a previously labeled file to be uploaded to a network location. That is, if the file already has a label assigned at the time of upload (i.e., a "preassigned" label), the techniques compare the preassigned label to the default label to determine if the preassigned label has a lower priority than the default label. In one example, the priority of the preassigned label is lower than the priority of the default label in the order based on a determination that the preassigned label allows for users not specified by the default label to open the file and to view contents of the file. In contrast, the priority of the preassigned label is higher than the priority of the default label in the order based on a determination that the preassigned label does not allow for users not specified by the default label to open the file and to view contents of the file, and further, the preassigned label also does not allow for at least one user specified by the default label to open the file and to view contents of the file.

The techniques can be configured to upgrade a file with a preassigned label of lower priority to the default label, while permitting another file to be stored without a label change if the preassigned label is of higher priority compared to the default label. Consequently, the techniques described herein enable a minimum level of security and protection for files stored at a particular network location by (i) automatically assigning a default label to a file that does not have a label already assigned, (ii) automatically upgrading a preassigned label for a file to the default label if the preassigned label is of a lower priority, and/or (iii) allowing a file that has a preassigned label of higher priority compared to the default label to be stored without changing the label (e.g., labels stricter than the default label are allowed to be maintained within files stored in the network location).

In various examples, if an owner of the network location changes the default label, then the new default label may be assigned to newly uploaded files. However, in some instances, the new default label may only be assigned to existing files, already stored at the network location, only if the new default label is of higher priority compared to the old default label. In this way, the labels already assigned to the existing files can only be upgraded to a higher priority label and can never be downgraded to a lower priority label. In other instances, the new default label may be assigned to all the existing files at the network location, regardless of a label priority comparison.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses a system for enabling a default label to be configured for a network location created to store files that are related in some way (e.g., files that are all associated with a work project). Once configured, the default label can be assigned to files at a time when the files are uploaded to the network location. An owner of the network location, e.g., the user that creates and/or administers the network location, can define the default label to be assigned to the files stored in the network location. Whenever an unlabeled file is uploaded to the network location, the unlabeled file automatically inherits the default label.

Furthermore, the system can be configured to consider an order of label priority when determining whether to assign a default label to a previously labeled file to be uploaded to the network location. That is, if the file already has a label assigned at the time of upload (i.e., a "preassigned" label), the system compares the preassigned label to the default label to determine if the preassigned label has a lower priority than the default label. In one example, the priority of the preassigned label is lower than the priority of the default label in the order based on a determination that the preassigned label allows for users not specified by the default label to open the file and to view contents of the file. In contrast, the priority of the preassigned label is higher than the priority of the default label in the order based on a determination that the preassigned label does not allow for users not specified by the default label to open the file and to view contents of the file, and further, the preassigned label also does not allow for at least one user specified by the default label to open the file and to view contents of the file.

The system can be configured to upgrade a file with a preassigned label of lower priority to the default label, while permitting another file to be stored without a label change if the preassigned label is of higher priority compared to the default label. Consequently, via implementation of the techniques described herein, users that upload files to the network location are covered, from the perspective of security and protection, if they forget or choose not to label the files uploaded to the network location. The users are also covered if they preassign a label that does not satisfy a minimum level of security and/or protection associated with a default label. Further, the users can save time because there is no longer a need to manually label each file on the client side (e.g., an application executing on the user device) before the file is uploaded to the network location.

Various examples, scenarios, and aspects that allow for the configuration and application of a default label to files stored in a network location, are described below with reference to FIGS. 1-7.

Figure 1:
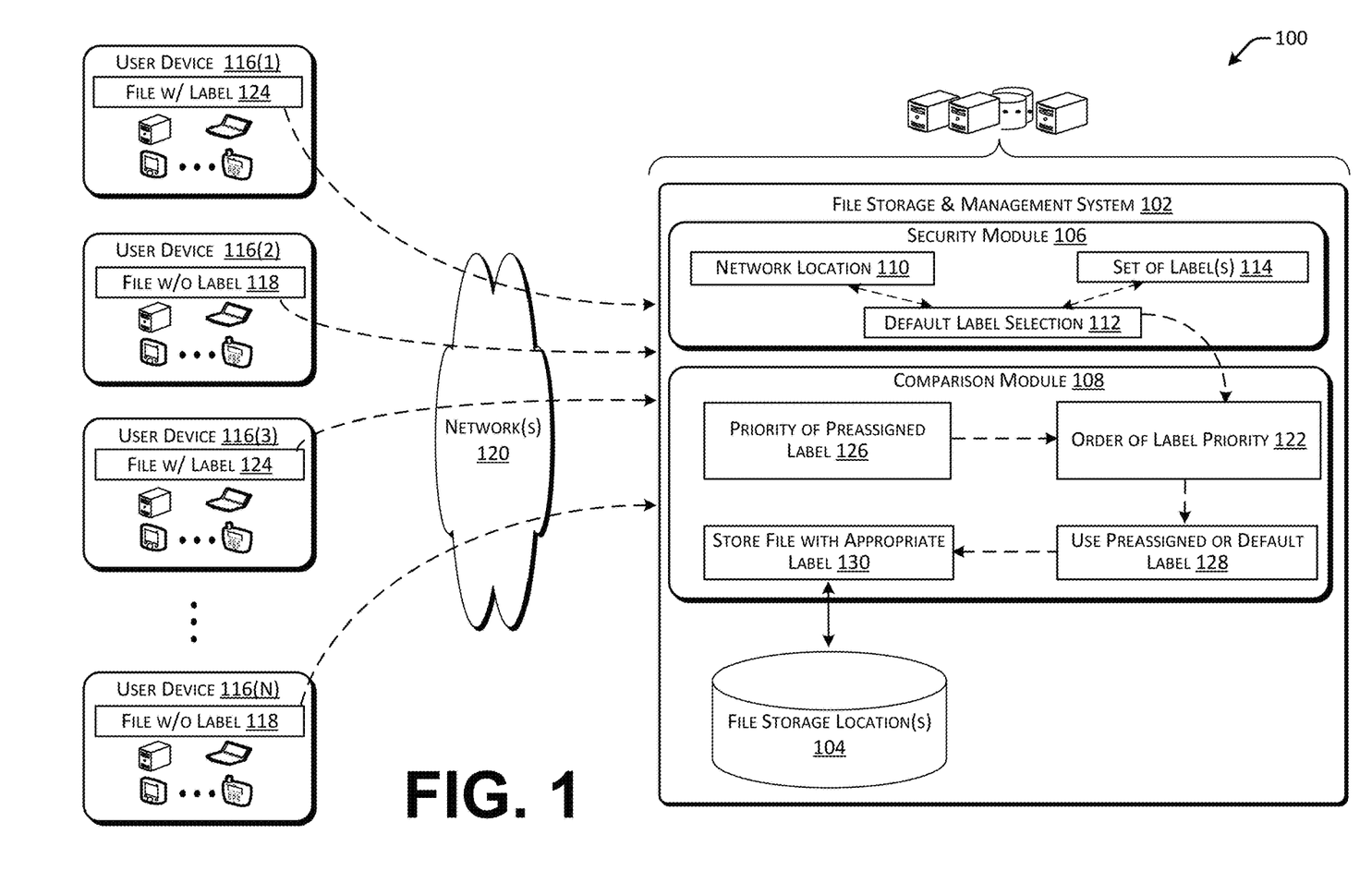
FIG. 1 is a diagram illustrating an example environment in which a system is configured to assign a default label to files stored in a network location.

FIG. 1 is a diagram illustrating an example environment 100 in which a system 102, such as a file storage and management system (e.g., GOOGLE DRIVE, MICROSOFT SHAREPOINT, DROPBOX, etc.), is configured to assign a default label to files stored in a network location. The system 102 includes resources (e.g., processing, storage, networking, etc.) to host various file storage locations 104, which are referred to herein as network locations. The network locations 104 are known spaces to which a service provider allocates resources so that the files can be accessed by groups or teams of users. The network locations 104 may alternatively be called sites or file libraries that can be accessed by uniform resource locators (URLs) or other sorts of network location identifiers. Consequently, a group of users that have an interest in accessing a set of files can use a network location to store the files so they can easily be shared amongst the group, and the system 102 enables this type of file storage and management.

The system 102 further includes a security module 106 and a comparison module 108. The security module 106 enables an owner of a network location 110 (e.g., one of network locations 104), e.g., the user that creates and/or administers the network location 110, to select a default label 112 from a predefined set of labels 114. The default label 112 is configured for the network location 110 such that the default label is assigned to files at a time when the files are uploaded to the network location 110.

Individual ones of the labels 114 specify various groups of users that are allowed, or authorized, to open the files stored at the network location 110 and to view the contents of the files. This group of users defined by a label 114 may be the same group of users authorized to access the network location 110. Alternatively, this group of users defined by a label 114 may be different than a group of users authorized to access the network location 110.

In one example, a label 114 may specify the users by listing individual user identifications (e.g., actual names, account names, email addresses, etc.). In another example, a label 114 may specify the users by listing defined user groups or users statuses (e.g., full time employees of the ABC company, employees of the ABC company that work in the finance department, any user with an email address with a specific domain, a team of users, participants in an educational class, etc.). In alternative examples, rather than selecting a default label 112 from a predefined set of labels 114, the owner of the network location 110 can define their own default label 112 (e.g., enter user identifications or defined user groups). This customized definition option may be useful to the owner of the network location 110 if the set of predefined labels 114 does not include an appropriate group of users to implement desired security and protection features based on the sensitivity and/or confidentiality of the contents stored in the files of the network location 110.

The labels 114 can also specify encryption methods for the files stored at the network location 110. The encryption method may be one of various types of encryption that provide different levels of protection for the files. As further described herein, the default label 112 is incorporated into the files stored in the network location 110, and therefore, the default label 112 is useable to govern access to the files and/or to copies of the files that are downloaded from the network location 110. In other words, the default label 112 travels with the files and/or the copies of the files once they leaves the network location 110 for additional protection. This prevents copies of the files from being passed on to, and opened by, a user that is not authorized to view the contents of the files.

The predefined set of labels 114 can be established by security or IT professionals on behalf of an organization (e.g., a corporation, an educational institution, etc.). The ability to select a default label 112, from a predefined set of labels 114, provides improved flexibility and efficiencies for owners of network locations to configure a network location level policy to protect files according to sensitivity and/or confidentiality considerations of various projects. Stated alternatively, the security module 106 enable various levels of security to be implemented based on a degree of sensitivity and/or confidentiality associated with an individual project, for which files are stored in the network location 110.

FIG. 1 illustrates various user devices 116(1-N) where N is a positive integer number (e.g., in the tens or hundreds or thousands). The user devices 116(1-N) belong to different users configured, and/or authorized, to access files stored in the network location 110. These users may be a team of users working together on a project. Accordingly, the user devices 116(1-N) may access the files stored in the network location 110 and/or upload files to the network location 110.

Whenever an unlabeled file is uploaded to the network location 110, the security module 106 determines that the file does not include a label, and therefore, the unlabeled file automatically inherits the default label 112. For instance, FIG. 1 shows that user devices 116(2) and 116(N) include files without labels 118. When these files 118 are uploaded to the network location 110 over network(s) 120, the security module 106 automatically assigns the default label 112 to the files 118 before they are stored in the network location 110. In this way, the files 118 are now protected from subsequent unauthorized use or viewing.

The comparison module 108 is configured to consider an order of label priority 122 when determining whether to assign a default label 112 to a previously labeled file to be uploaded to the network location 110. For instance, FIG. 1 shows that user devices 1116(1) and 116(3) include files 124 with preassigned labels (e.g., labels added by users during the creation and/or editing of the files), and these files 124 can also be uploaded to the network location 110 over network(s) 120. The comparison module 108 is configured to use the order of label priority 122 to compare a priority of a preassigned label 126 (e.g., the preassigned label assigned to one of files 124) and a priority of the default label 112, and to determine whether the preassigned label has a priority 126 that is higher or lower compared to the priority of the default label 112.

In one example, the priority 126 of the preassigned label is lower than the priority of the default label 112 based on a determination that the preassigned label allows for users not specified by the default label 112 to open the file 124 and to view contents of the file 124. In contrast, the priority 126 of the preassigned label is higher than the priority of the default label 112 based on a determination that the preassigned label does not allow for users not specified by the default label 112 to open the file 124 and to view contents of the file 124, and further, the preassigned label also does not allow for at least one user specified by the default label 112 to open the file 124 and to view contents of the file 124. The order of the label priority 122 is configured to account for these differences in user groups.

Based on the comparison, the comparison module 108 is configured to either assign the default label 112 to a file 124 with a preassigned label (e.g., upgrade the file to a stricter label when the default label 112 is stricter) or to let the file 124 be stored with the preassigned label if the preassigned label is stricter compared to the default label 112, as referenced by 128. The file 124 can then be stored in the network location 110 with the appropriate label (e.g., one of network locations 104), as referenced by 130.

Consequently, the system 102 enables a minimum level of security and protection for files stored at a particular network location 110 by (i) automatically assigning a default label 112 to a file 118 that does not have a label already assigned, (ii) automatically upgrading a preassigned label for a file 124 to the default label 112 if the preassigned label is of a lower priority, and/or (iii) allowing a file 124 that has a preassigned label of higher priority compared to the default label 112 to be stored without changing the label. These techniques benefit users of the network location 110 because the users are covered, from the perspective of security and protection, if they forget or choose not to label the files uploaded to a network location 119. Moreover, the users are covered if they assign a label that does not satisfy a minimum level of security and protection established by the use of the default label 112. Further, the aforementioned users can save time because there is no longer a need to manually label each file on the user side (e.g., an application executing on user device 116(1-N)) before the file is uploaded to the network location 110.

The number of illustrated modules in the system 102 is just an example, and the number can vary higher or lower. That is, functionality described herein in association with the illustrated modules can be performed by a fewer number of modules or a larger number of modules on one device or spread across multiple devices.

Figure 2:
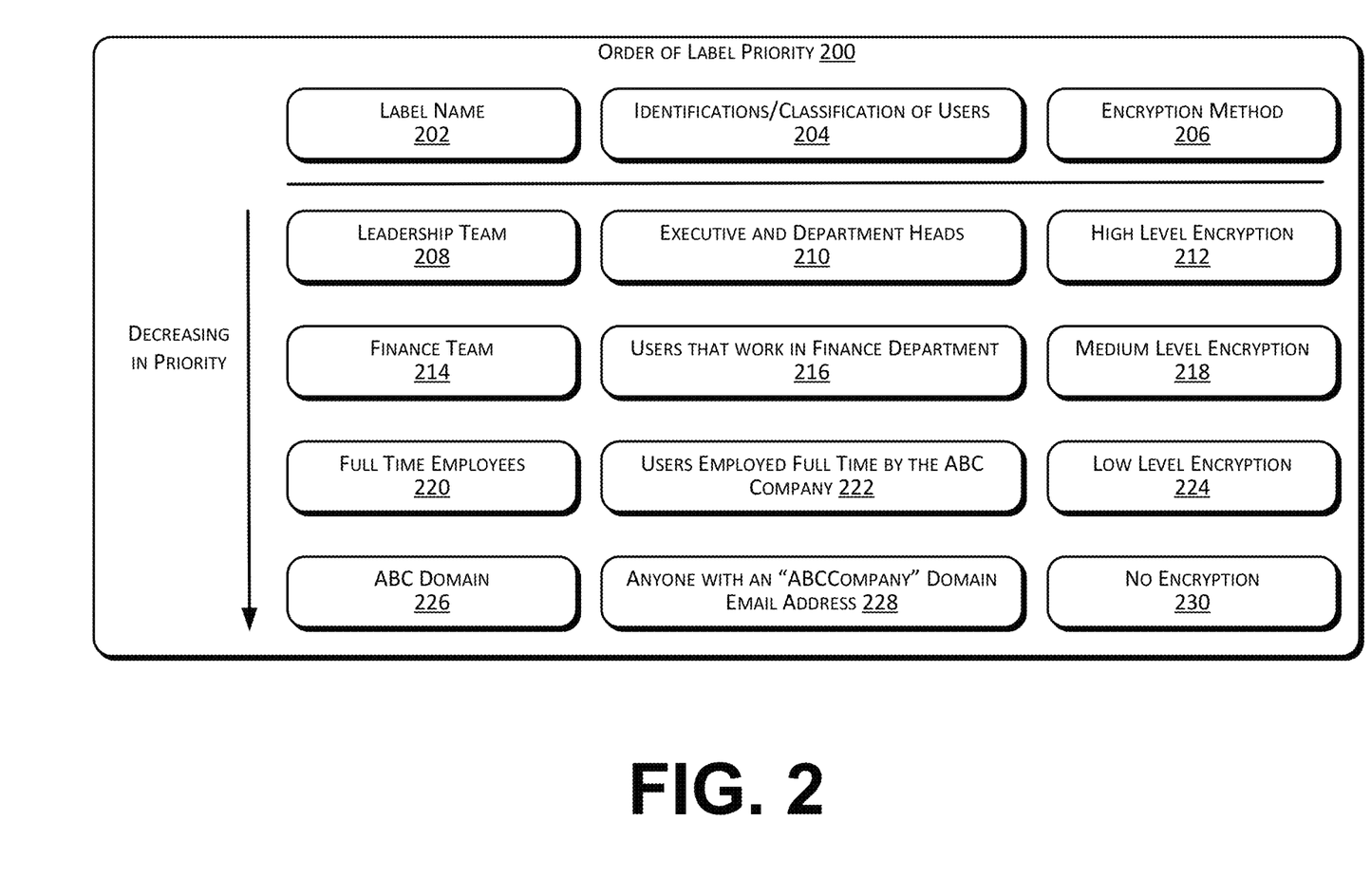
FIG. 2 is a block diagram illustrating an order of label priority that can be used to determine whether a label for a file needs to be upgraded prior to storage in a network location.

FIG. 2 is a block diagram illustrating an order of label priority 200 that can be used to determine whether a label for a file needs to be upgraded prior to storage in a network location. In various examples, the order of label priority reflects the predefined set of labels 114 available to owners of network locations 104 for selection.

As shown, each label may include a label name 202 (as it appears on a GUI view into the network location), identifications and/or classifications of users 204 that correspond to the label name 202 and that are authorized to open and view contents of files, and an encryption method 206 for files stored in a network location. Following this framework, a set of example labels is listed in decreasing order of priority in FIG. 2.

A first label is named the leadership team 208. The leadership team 208 includes users that are either executive or department heads 210, and files stored in a network location with this label are protected using a high level of encryption 212. This first label may be the highest priority label because only a small number of people are executives or department heads (e.g., fifteen people).

A second label is named the finance team 214. The finance team 214 includes users that work in the finance department 216, and files stored in a network location with this label are protected using a medium level of encryption 218. This second label may be the next highest priority label because people employed in a specific department may be limited (e.g., one hundred people).

A third label is named the full time employees 220. The full time employees 220 includes all the users of the ABC company that work full time 222. Files stored in a network location with this label are protected using a low level of encryption 224. This third label has lower priority than the first two labels because the number of people employed by the ABC company may be a large number (e.g., five thousand full time employees).

Finally, a fourth label is named the ABC domain 226. The ABC domain 226 includes all the users that have an email address for the "ABCCompany" domain 228. This group may include full time employees, as well as part time employees and/or approved vendors. Thus, this label is of the lowest priority in this example order. Files stored in a network location with this label are protected using no encryption 230.

Figure 3:
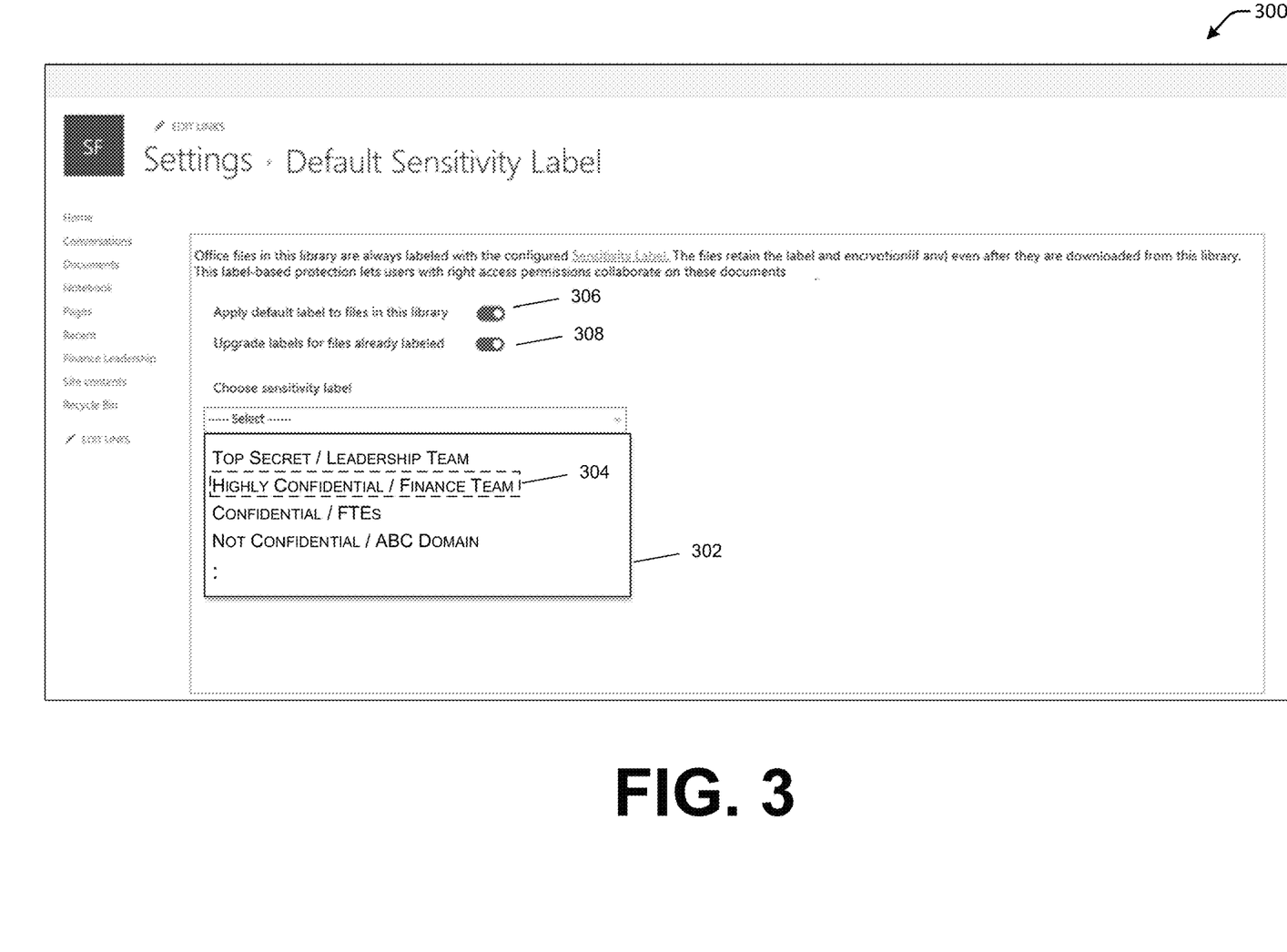
FIG. 3 illustrates an example graphical user interface (GUI) that shows how an owner of a network location can select a default label to be assigned to files to be uploaded to the network location and/or to existing files that have been previously uploaded to the network location.

FIG. 3 illustrates an example graphical user interface (GUI) 300 that shows how an owner of a network location can select a default label to be assigned to files to be uploaded to the network location and/or to existing files that have been previously uploaded to the network location. As show, as part of the network location (e.g., library) creation and/or administration, a user can be presented with a menu of predefined labels 302 from which a selection 304 can be made (e.g., the finance team).

Furthermore, the GUI 300 presents users with a first option 306 to apply the selected default label to files to be uploaded to the library, as well as a second option 308 to upgrade labels for existing files that are already stored in the library. The first option 306 enables the menu of labels 302 and the selection 304 to occur. The second option 308 determines whether the selected default label should be assigned to files that are already stored in the network location. In various examples, if the user selects and/or changes the default label at a time when existing files are already stored in the library, then option 308 enables assignment of the default label to existing files only if the newly selected default label is of higher priority compared an existing label for a file already stored in the library. The existing label may be an old default label or a preassigned label. In this way, the labels already assigned to the existing files can only be upgraded to a higher priority label and can never be downgraded to a lower priority label.

Figure 4:
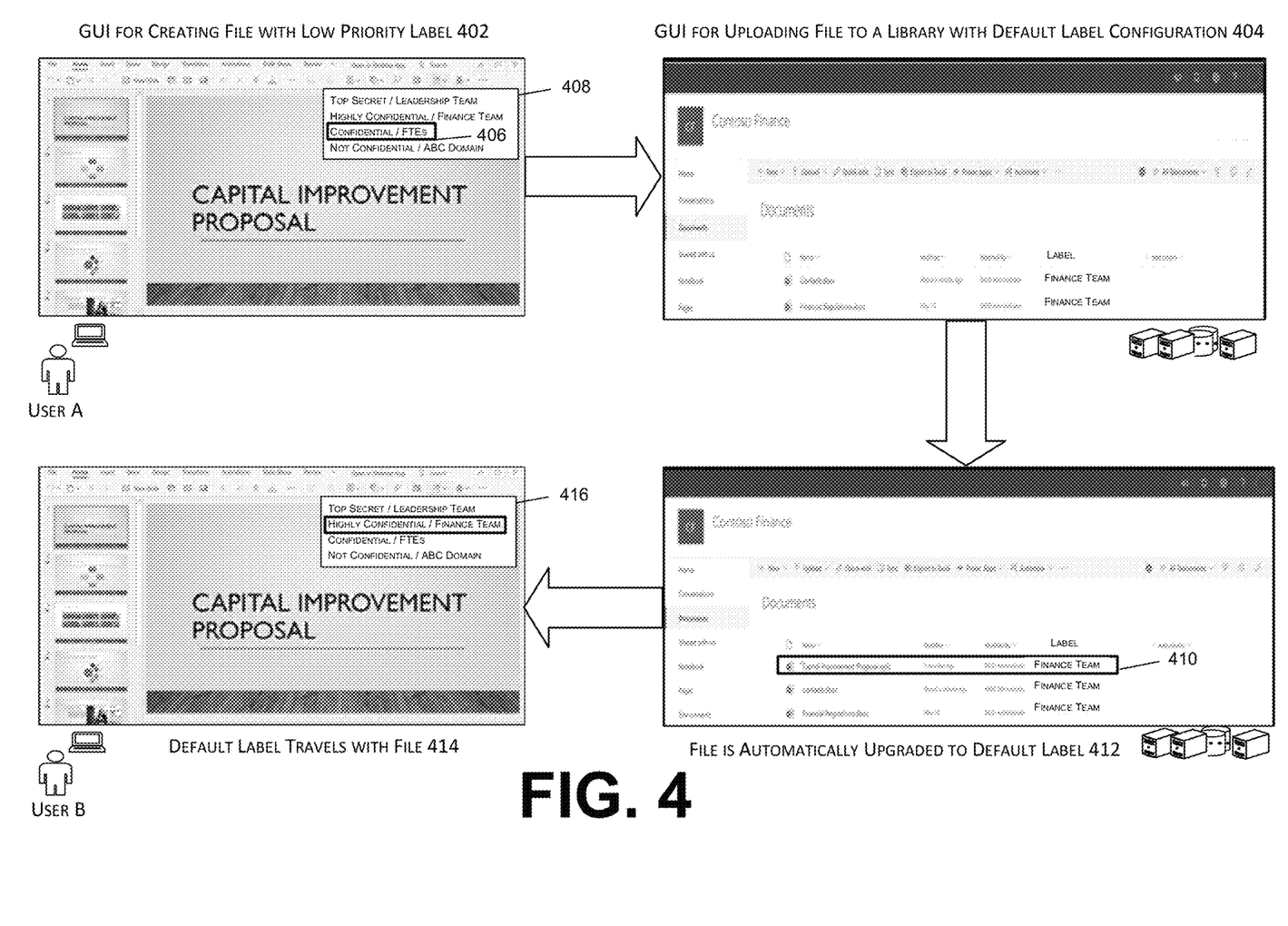
FIG. 4 illustrates a series of example GUIs that show how a default label can replace a preassigned label to better protect a file that is uploaded to a network location.

FIG. 4 illustrates a series of example GUIs that show how a default label can replace a preassigned label to better protect a file that is uploaded to a network location. As shown by the first GUI 402, a first user A creates and/or edits a file (e.g., a presentation entitled "Capital Improvement Proposal") to be stored in a network location, represented by a second GUI 404. The first user A selects a low priority label 406 (e.g., "Confidential/FTEs"), from a predefined set of labels 408, prior to uploading the file to the network location.

As shown via GUI 404, the network location is configured with a default label. That is, the network location lists the files stored therein, and this list includes a column that defines the default label (e.g., "Finance Team") to that viewers know the minimum level of security and/or protection applied to the files stored therein. When the file entitled "Capital Improvement Proposal" is uploaded with a preassigned label that is of lower priority compared to the default label, the comparison module 108 automatically upgrades the preassigned label (e.g., "Confidential/FTEs") to the default label (e.g., "Finance Team"), as shown by the box 410 in GUI 412.

Then, when another user B accesses and opens the file, as shown in GUI 414, user B can see the stricter default label 416 that is incorporated within the file and that travels with the file once it leaves the network location (e.g., is downloaded and saved on a user device). This prevents a copy of the file from being passed on to, and opened by, a user that is not authorized to view the contents of the file. For instance, user B may create a copy of the file and attempt to pass it on so another user, not identified via the default label, can open the file and view its contents. However, the incorporation of the default label within the file prevents this other user from opening the file and viewing its contents.

In various examples, an exception can be made for storing a file with a label that is of lower priority than a default label, as there may be reasons where this is beneficial. For instance, a document may include general information that is important, but that does not include any sensitive and/or confidential information. If a user that has uploaded a document to a network location intends for such a file to have a label that is of lower priority than a default label, this user can communicate the intent by attempting to change the default label in the network location. Before the change, and based on this attempt, a notification can be sent to an owner of the network location. In various examples, the owner must authorize such a change before it is implemented in the network location.

Figure 5:
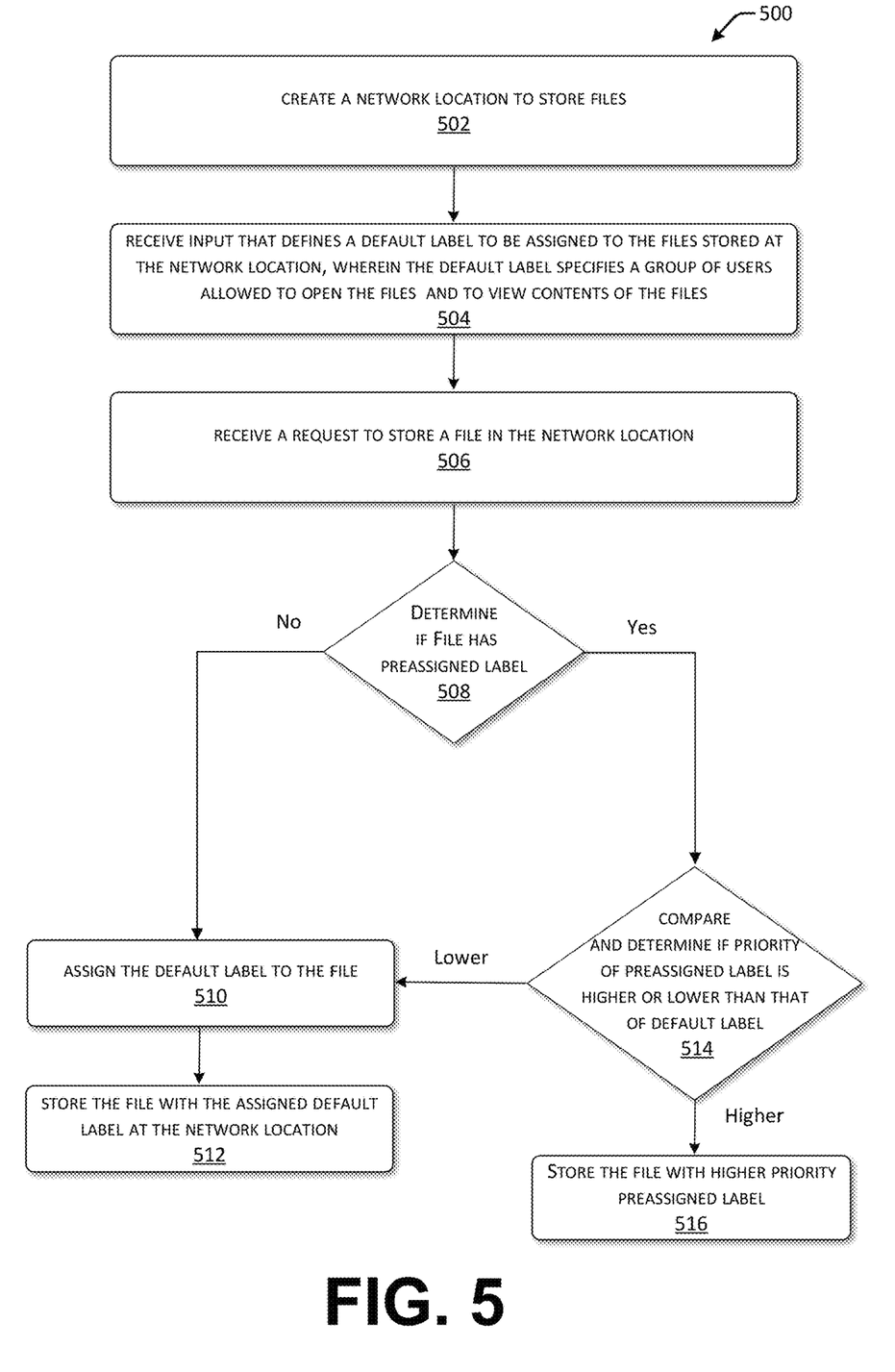
FIG. 5 is a flow diagram of an example method for configuring a default label for a network location and determining whether a label for a file needs to be upgraded prior to storage in a network location.

FIG. 5 is a flow diagram illustrating routines describing aspects of the present disclosure. The logical operations described herein with regards to FIG. 5 can be implemented (1) as a sequence of computer implemented acts or program modules running on a device and/or (2) as interconnected machine logic circuits or circuit modules within a device.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like.

Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

FIG. 5 is a flow diagram of an example method 500 for configuring a default label for a network location and determining whether a label for a file needs to be upgraded prior to storage in a network location.

At operation 502, a network location that stores files for a project is created. At operation 504, input that defines a default label to be assigned to the files stored at the network location is received. As described above, the default label specifies a group of users allowed to open the files and to view contents of the files. Further, the default label can define an encryption method used to protect the files.

At operation 506, a request to store a file in the network location is received. At operation 508, it is determined if the file has a preassigned label at the time the request is received. If the answer to operation 508 is "No", then the default label is assigned to the file at operation 510 and the file is stored at the network location at operation 512.

If the answer to operation 508 is "Yes", then a priority of the preassigned label is compared to the priority of the default label, at operation 514, to determine if the priority of the preassigned label is lower or higher than the priority of the default label. In other words, it is determined if the preassigned label allows for users outside of the group of users specified by the default label to view the contents of the file.

If it is determined that the priority of the preassigned label is lower than the priority of the default label, then the process proceeds to operation 510 where the default label is assigned to the file (e.g., replaces the preassigned label) and the file is stored at the network location at operation 512. If it is determined that the priority of the preassigned label is higher than the priority of the default label, then the process proceeds to operation 516 where the file can be stored with its higher priority preassigned label.

Figure 6:
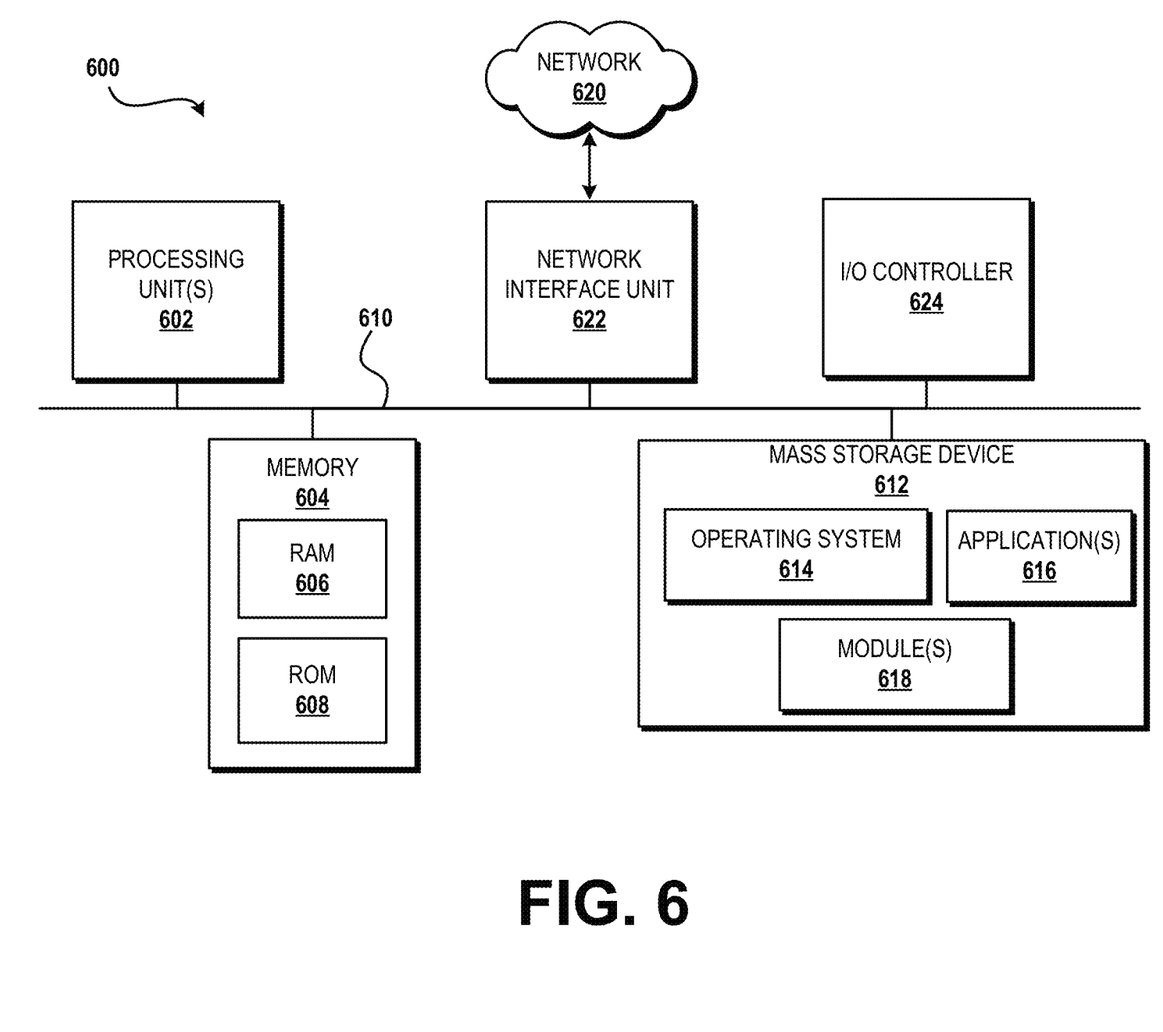
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the system 102, capable of executing computer instructions (e.g., a module or a program component described herein). The computer architecture 600 illustrated in FIG. 6 includes processing unit(s) 602, a system memory 604, including a random access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618 (e.g., the security module 106, the comparison module 108), and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
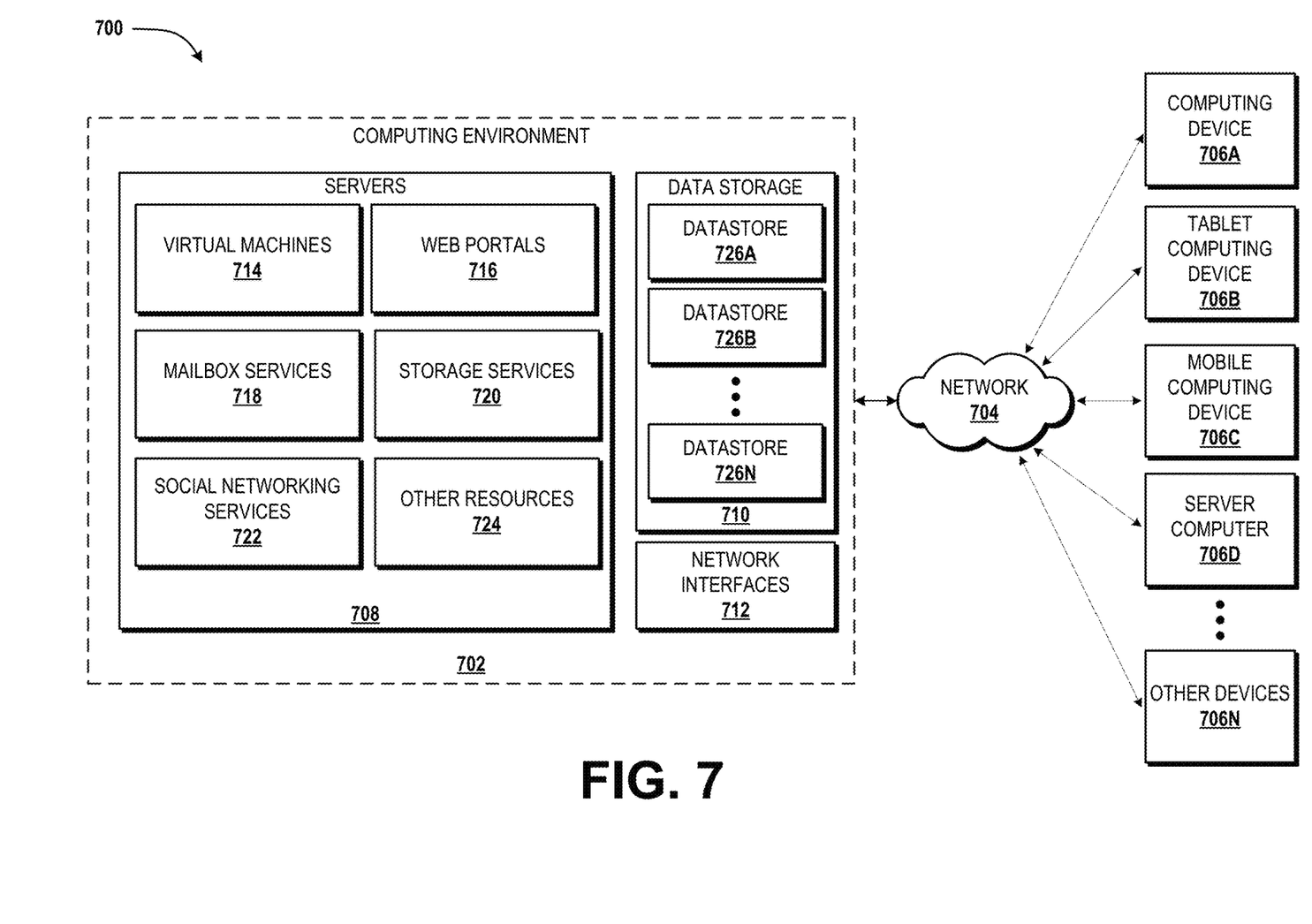
FIG. 7 is a diagram illustrating a distributed computing environment capable of implementing aspects of the techniques and technologies presented herein.

FIG. 7 depicts an illustrative distributed computing environment 700 within which the techniques described herein can be implemented. For example, the distributed computing environment 700 can includes resources that can provide a service to user devices.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

The disclosure presented herein also encompasses the subject matter set forth in the following clauses.

Example Clause A

A system comprising: one or more processing units; and computer-readable storage media storing instructions, that when executed by the one or more processing units, configure the system to perform operations comprising: creating a network location to store files for a project, wherein the network location is accessible to a first plurality of users working on the project; receiving input that defines a default label to be assigned to the files stored at the network location, wherein the default label specifies a second plurality of users allowed to open the files and to view contents of the files; receiving a request to store a file in the network location; determining whether a label is assigned to the file at a time when the request is received; based on a determination that the label is not assigned to the file at the time when the request is received: assigning the default label to the file; storing the file with the assigned default label at the network location; and based on a determination that the label is assigned to the file at the time when the request is received: comparing a priority of the label to a priority of the default label; determining, based on the comparison, that the priority of the label is lower than the priority of the default label; assigning the default label to the file based on the determination that the priority of the label is lower than the priority of the default label; and storing the file with the assigned default label at the network location.

Example Clause B

The system of Example Clause A, wherein the default label is incorporated into the file and is useable to govern access to a copy of the file that is downloaded from the network location.

Example Clause C

The system of Example Clause A or Example Clause B, wherein an owner of the network location selects the default label from a predefined set of labels.

Example Clause D

The system of Example Clause A or Example Clause B, wherein an owner of the network location identifies the second plurality of users specified in the default label.

Example Clause E

The system of any one of Example Clauses A through D, wherein the priority of the label is lower than the priority of the default label based on a determination that the label allows for one or more users not included in the second plurality of users to open the file and to view contents of the file.

Example Clause F

The system of any one of Example Clauses A through E, wherein the default label specifies an encryption method for the files stored at the location.

Example Clause G

The system of any one of Example Clauses A through F, wherein the network location is configured to store an additional file with a preassigned label if a priority of the preassigned label is higher than the priority of the default label.

Example Clause H

The system of Example Clause G, wherein the priority of the preassigned label is higher than the priority of the default label based on a determination that (i) the preassigned label does not allow for one or more of the second plurality of users to open the additional file and to view contents of the additional file and (ii) the preassigned label does not allow for a user not included in the second plurality of users to open the additional file and to view contents of the additional file.

Example Clause I

A method comprising: receiving input that defines a default label to be assigned to files stored at a network location, wherein the default label specifies a plurality of users allowed to open the files and to view contents of the files; receiving a request to store a file in the network location; determining, by one or more processing units, that one or more users other than the plurality of users are allowed to open the file and view contents of the file at a time when the request is received; based on a determination that the one or more users other than the plurality of users are allowed to open the file and view contents of the file at the time when the request is received: assigning the default label to the file; and storing the file with the assigned default label at the network location.

Example Clause J

The method of Example Clause I, wherein assigning the default label to the file comprises replacing a preassigned label that specifies the one or more users other than the plurality of users.

Example Clause K

The method of Example Clause I, wherein the file is an unlabeled file at the time when the request is received, thereby allowing any user to open the file and view the contents of the file.

Example Clause L

The method of any one of Example Clauses I through K, wherein the default label is incorporated into the file and is useable to govern access to a copy of the file that is downloaded from the network location.

Example Clause M

The method of any one of Example Clauses I through L, wherein an owner of the network location selects the default label from a predefined set of labels.

Example Clause N

The method of any one of Example Clauses I through M, wherein the default label specifies an encryption method for the files stored at the location.

Example Clause O

A system comprising: one or more processing units; and computer-readable storage media storing instructions, that when executed by the one or more processing units, configure the system to perform operations comprising: receiving input that defines a default label to be assigned to files stored at a network location, wherein the default label specifies a plurality of users allowed to open the files and to view contents of the files; receiving a request to store a file in the network location; determining that one or more users other than the plurality of users are allowed to open the file and view contents of the file at a time when the request is received; based on a determination that the one or more users other than the plurality of users are allowed to open the file and view contents of the file at the time when the request is received: assigning the default label to the file; and storing the file with the assigned default label at the network location.

Example Clause P

The system of Example Clause O, wherein assigning the default label to the file comprises replacing a preassigned label that specifies the one or more users other than the plurality of users.

Example Clause Q

The system of Example Clause O, wherein the file is an unlabeled file at the time when the request is received, thereby allowing any user to open the file and view the contents of the file.

Example Clause R

The system of any one of Example Clauses O through Q, wherein the default label is incorporated into the file and is useable to govern access to a copy of the file that is downloaded from the network location.

Example Clause S

The system of any one of Example Clauses O through R, wherein the default label is selected from a predefined set of labels.

Example Clause T

The system of any one of Example Clauses O through S, wherein the default label specifies an encryption method for the files stored at the location.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different labels, two different groups of users, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A system comprising:
one or more processing units; and
computer-readable storage media storing instructions, that when executed by the one or more processing units, configure the system to perform operations comprising:
creating a network location to store files for a project, wherein the network location is accessible to a first plurality of users working on the project;
receiving input that defines a default label to be assigned to the files stored at the network location, wherein the default label specifies a second plurality of users allowed to open the files and to view contents of the files;
receiving a request to store a file in the network location;
determining whether a label is assigned to the file at a time when the request is received;
based on a determination that the label is not assigned to the file at the time when the request is received:
assigning the default label to the file; and
storing the file with the assigned default label at the network location; and
based on a determination that the label is assigned to the file at the time when the request is received:
comparing a priority of the label to a priority of the default label;
determining, based on the comparison, that the priority of the label is lower than the priority of the default label;
assigning the default label to the file based on the determination that the priority of the label is lower than the priority of the default label; and
storing the file with the assigned default label at the network location.

2. The system of claim 1, wherein the default label is incorporated into the file and is useable to govern access to a copy of the file that is downloaded from the network location.

3. The system of claim 1, wherein an owner of the network location selects the default label from a predefined set of labels.

4. The system of claim 1, wherein an owner of the network location identifies the second plurality of users specified in the default label.

5. The system of claim 1, wherein the priority of the label is lower than the priority of the default label based on a determination that the label allows for one or more users not included in the second plurality of users to open the file and to view contents of the file.

6. The system of claim 1, wherein the default label specifies an encryption method for the files stored at the network location.

7. The system of claim 1, wherein the network location is configured to store an additional file with a preassigned label if a priority of the preassigned label is higher than the priority of the default label.

8. The system of claim 7, wherein the priority of the preassigned label is higher than the priority of the default label based on a determination that (i) the preassigned label does not allow for one or more of the second plurality of users to open the additional file and to view contents of the additional file and (ii) the preassigned label does not allow for a user not included in the second plurality of users to open the additional file and to view contents of the additional file.

9. A method comprising:
receiving input that defines a default label having a minimum level of security to be automatically assigned to files stored at a network location, wherein the default label specifies a plurality of users allowed to open the files and to view contents of the files and prevents one or more users other than the plurality of users from opening the files and viewing the contents of the files;
receiving a request to store a file in the network location;
analyzing a label that has previously been assigned to the file before the request to store the file in the network location is received, the analyzing revealing that the label has a level of security that is lower than the minimum level of security;
determining, by one or more processing units and based on the analyzing, that the one or more users other than the plurality of users are allowed to open the file and view contents of the file based on the label having the level of security that is lower than the minimum level of security;
based on a determination that the one or more users other than the plurality of users are allowed to open the file and view the contents of the file:
automatically assigning the default label to the file by replacing the label with the default label thereby preventing the one or more users other than the plurality of users from opening the file and viewing the contents of the file after the file is stored at the network location; and
storing the file with the automatically assigned default label at the network location.

10. The method of claim 9, wherein the default label is incorporated into the file and is useable to govern access to a copy of the file that is downloaded from the network location.

11. The method of claim 9, wherein an owner of the network location selects the default label from a predefined set of labels.

12. The method of claim 9, wherein the default label specifies an encryption method for the files stored at the network location.

13. A system comprising:
one or more processing units; and
computer-readable storage media storing instructions, that when executed by the one or more processing units, configure the system to perform operations comprising:
receiving input that defines a default label having a minimum level of security to be automatically assigned to files stored at a network location, wherein the default label specifies a plurality of users allowed to open the files and to view contents of the files and prevents one or more users other than the plurality of users from opening the files and viewing the contents of the files;

receiving a request to store a file in the network location;

analyzing a label that has previously been assigned to the file before the request to store the file in the network location is received, the analyzing revealing that the label has a level of security that is lower than the minimum level of security;

determining, based on the analyzing, that the one or more users other than the plurality of users are allowed to open the file and view contents of the file based on the label having the level of security that is lower than the minimum level of security;

based on a determination that the one or more users other than the plurality of users are allowed to open the file and view the contents of the file:

automatically assigning the default label to the file by replacing the label with the default label thereby preventing the one or more users other than the plurality of users from opening the file and viewing the contents of the file after the file is stored at the network location; and     storing the file with the automatically assigned default label at the network location.

14. The system of claim 13, wherein the default label is incorporated into the file and is useable to govern access to a copy of the file that is downloaded from the network location.

15. The system of claim 13, wherein the default label is selected from a predefined set of labels.

16. The system of claim 13, wherein the default label specifies an encryption method for the files stored at the network location.

\* \* \* \* \*